(12) United States Patent
Klein et al.

(10) Patent No.: US 9,397,490 B1
(45) Date of Patent: Jul. 19, 2016

(54) SEALED WALL PLATE

(71) Applicants: John Klein, Gilbert, AZ (US); Jeffrey Baldwin, Desert Hills, AZ (US); Ryan Liebengood, Gilbert, AZ (US)

(72) Inventors: John Klein, Gilbert, AZ (US); Jeffrey Baldwin, Desert Hills, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 14/980,219

(22) Filed: Dec. 28, 2015

Related U.S. Application Data

(63) Continuation of application No. 14/222,586, filed on Mar. 21, 2014, now Pat. No. 9,236,722.

(60) Provisional application No. 61/807,757, filed on Apr. 3, 2013.

(51) Int. Cl.
*H02G 3/08* (2006.01)

(52) U.S. Cl.
CPC .................................. *H02G 3/081* (2013.01)

(58) Field of Classification Search
USPC ...................................................... 174/66, 67
See application file for complete search history.

(56) References Cited

U.S. PATENT DOCUMENTS

| | | | |
|---|---|---|---|
| 3,113,174 A * | 12/1963 | Spiteri | H01R 13/447 174/67 |
| 4,293,173 A | 10/1981 | Tricca | |
| 8,222,522 B1 | 7/2012 | Easthouse | |

* cited by examiner

*Primary Examiner* — Dhirubhai R Patel
(74) *Attorney, Agent, or Firm* — Ryan Liebengood

(57) ABSTRACT

A wall plate including a plate having a front surface and a rear surface, rear walls extending from and away from the rear surface to form a cavity, and a gasket positioned wholly within the cavity. The gasket may be positioned adjacent the rear walls or adjacent at least one aperture within the plate.

8 Claims, 8 Drawing Sheets

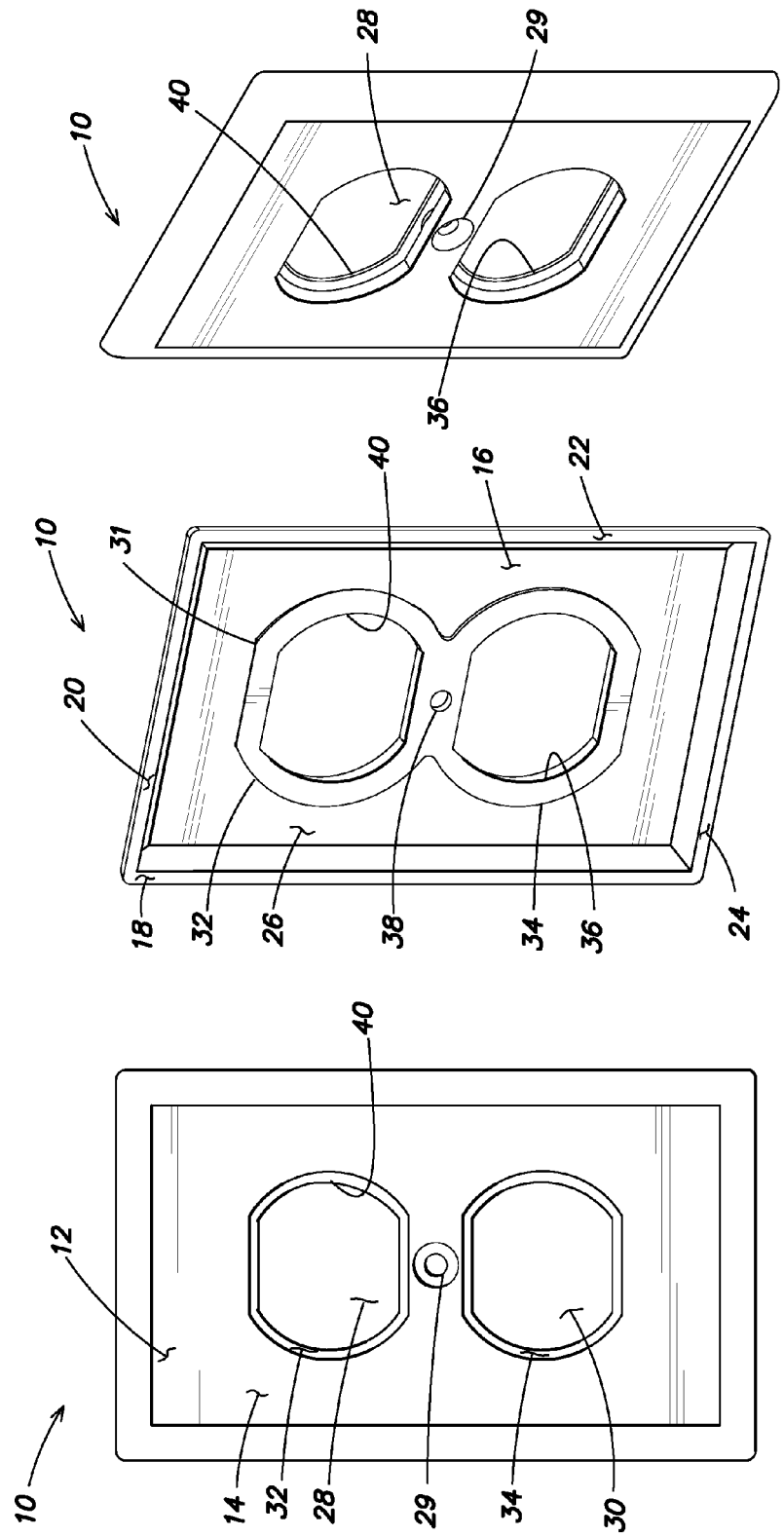

SEALED WALL PLATE

CROSS-REFERENCE TO RELATED APPLICATIONS

This application claims priority to U.S. patent application Ser. No. 14/222,586, filed on Mar. 21, 2014, and titled "Sealed Wall Plate", which is currently pending, and U.S. Provisional Patent Application No. 61/807,757, filed on Apr. 3, 2013, and titled "Sealed Wall Plate", the disclosures of which is hereby incorporated herein by reference.

BACKGROUND

1. Technical Field

Aspects of the present disclosure relate generally to wall plates and wall plates which seal the open area behind the wall plate.

2. Background Art

Wall plates are well known and are used to fill in the space between an electrical box and an electrical device. Specifically, the wall plates are known to provide a more aesthetically pleasing appearance while also preventing access to the electrical device. By preventing access to the electrical device, the user is safer because electrical wiring is not readily accessible.

SUMMARY

Aspects of this disclosure relate to a sealed wall plate. In one aspect, a wall plate including a plate having a front surface and a rear surface, rear walls extending from and away from the rear surface to form a cavity, and a gasket positioned wholly within the cavity.

In an implementation, the gasket may be positioned within the cavity and adjacent the rear walls. The plate may further include at least one aperture positioned between the rear walls extending between the front surface and the rear surface and wherein the gasket is positioned adjacent the at least one aperture. The gasket surrounds the at least one aperture. A first gasket may be positioned adjacent the rear walls and a second gasket may be positioned adjacent the at least one aperture. The gasket may contact at least a portion of an electrical device positioned within the wall plate. The gasket may be composed of foam. The gasket may be composed of rubber.

In another aspect, a wall plate includes a body having a front surface and a rear surface, a plurality of walls extending rearward from the body, at least one aperture in the body, a first gasket adjacent the plurality of walls, and a second gasket adjacent the at least one aperture.

In an implementation, the first gasket may contact a wall adjacent the body. The second gasket may contact an electrical device positioned within the at least one aperture. The first and second gaskets may be positioned within a cavity formed by the rear surface and the plurality of walls. The at least one aperture in the body may further include two apertures in the body.

In another aspect, a wall plate includes a body having a front surface and a rear surface, a plurality of walls extending rearward from the body, at least one aperture in the body, an inner wall and an outer wall extending rearward from the plurality of walls and defining a gasket cavity, and a gasket positioned in the gasket cavity.

In an implementation, the wall plate may include a second gasket positioned around the at least one aperture in the body. The at least one aperture may be two apertures. The gasket cavity may be positioned rearward of a cavity formed by the plurality of walls. The gasket may be composed of a compressible foam. The gasket may be composed of rubber.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 1 is a front view of a sealed wall plate.

FIG. 2 is rear perspective view of the sealed wall plate.

FIG. 3 is a front perspective view of the sealed wall plate.

DETAILED DESCRIPTION

Figure 4:
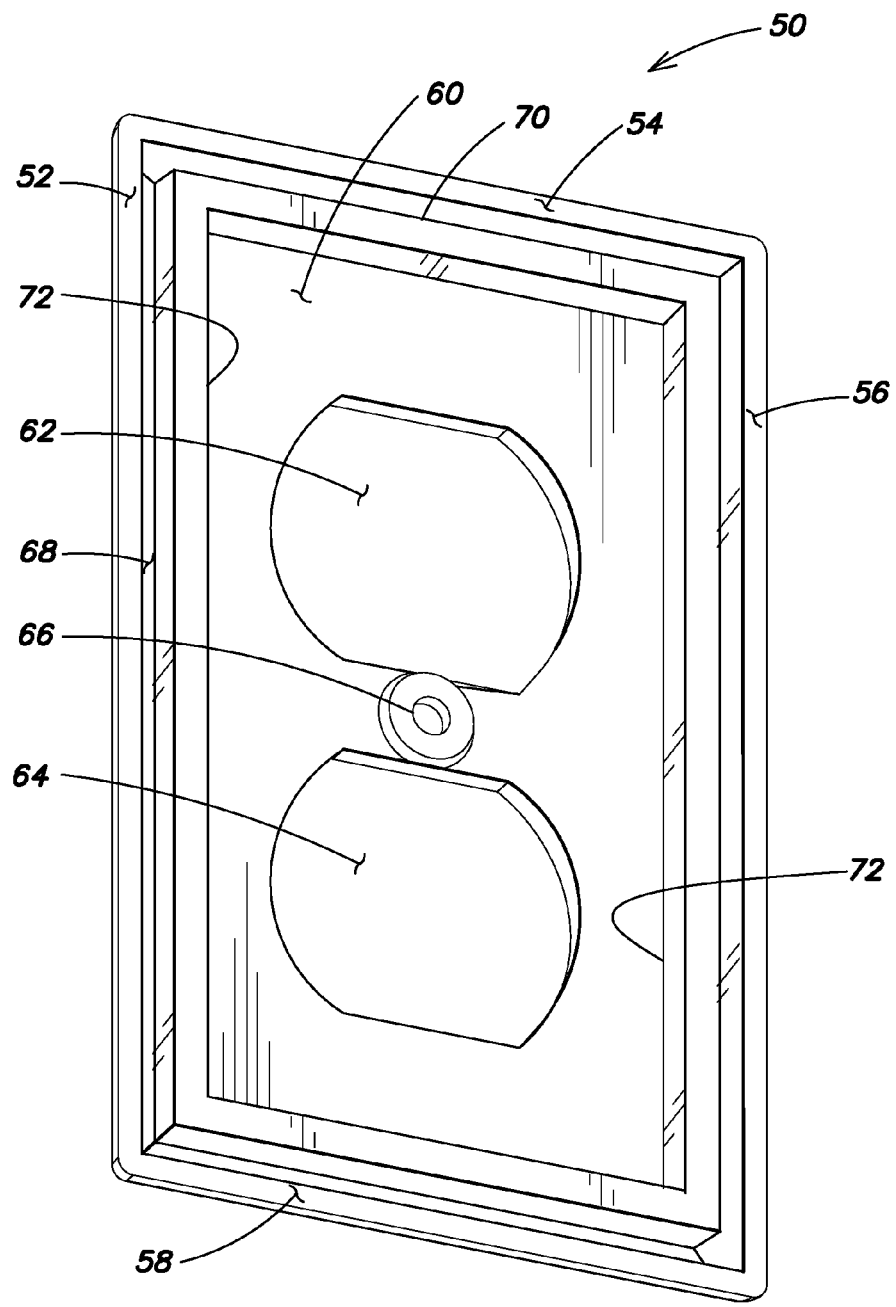
FIG. 4 is a rear perspective view of a second sealed wall plate.
Figure 6:
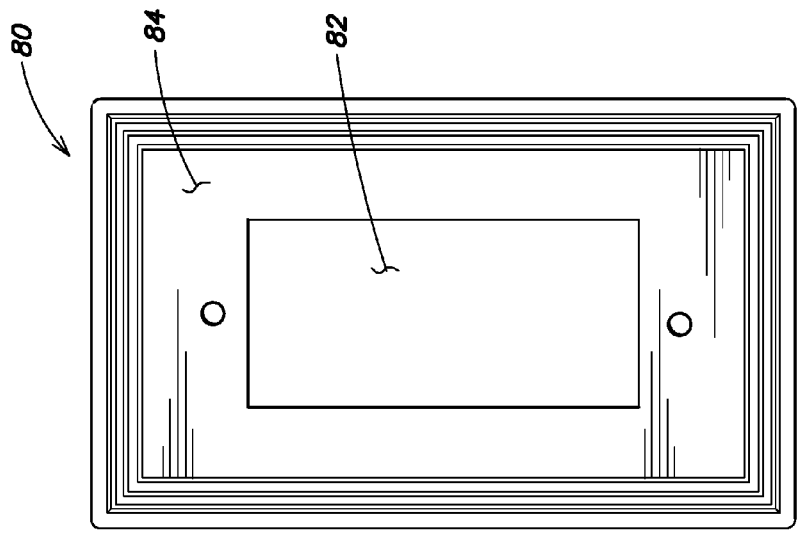
FIG. 6 is a rear view of the third sealed wall plate.
Figure 5:
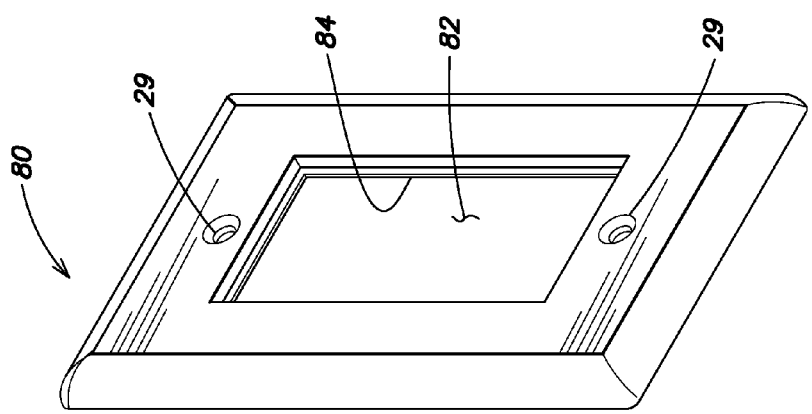
FIG. 5 is a perspective view of a third sealed wall plate.
Figure 8:
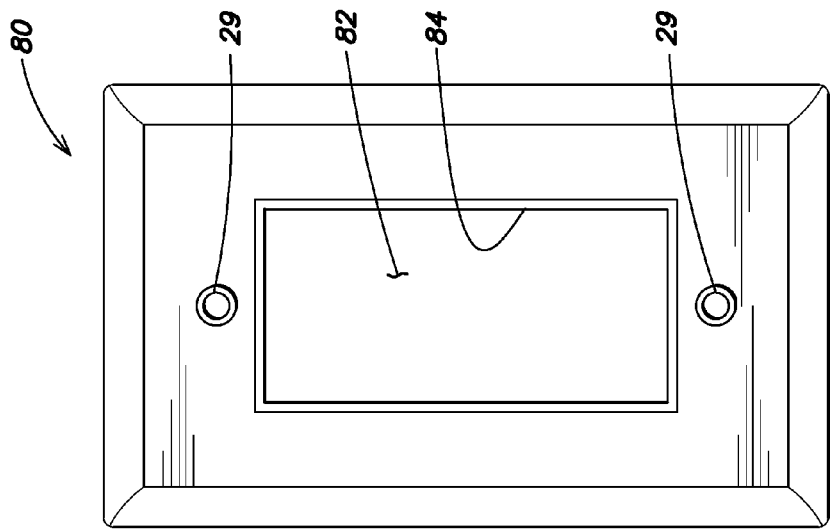
FIG. 8 is a front view of the third sealed wall plate.
Figure 7:
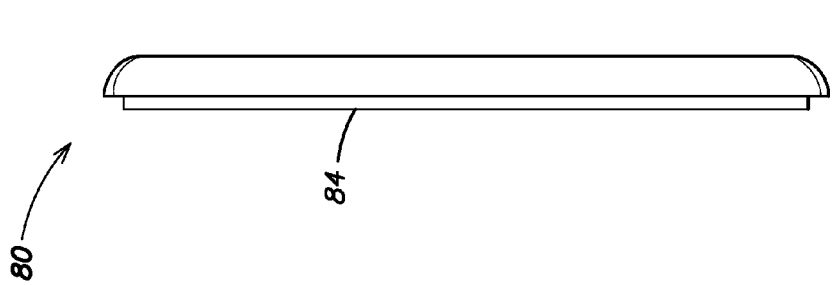
FIG. 7 is a side view of the third sealed wall plate.
Figure 9:
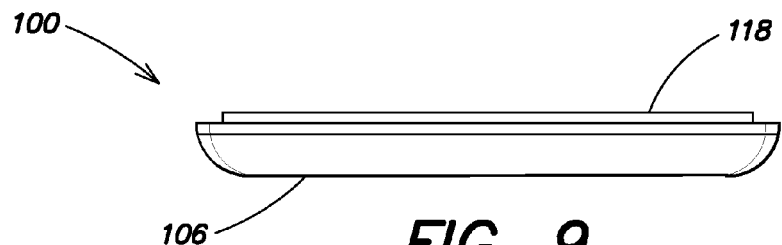
FIG. 9 is a top view of a fourth sealed wall plate.
Figure 10:
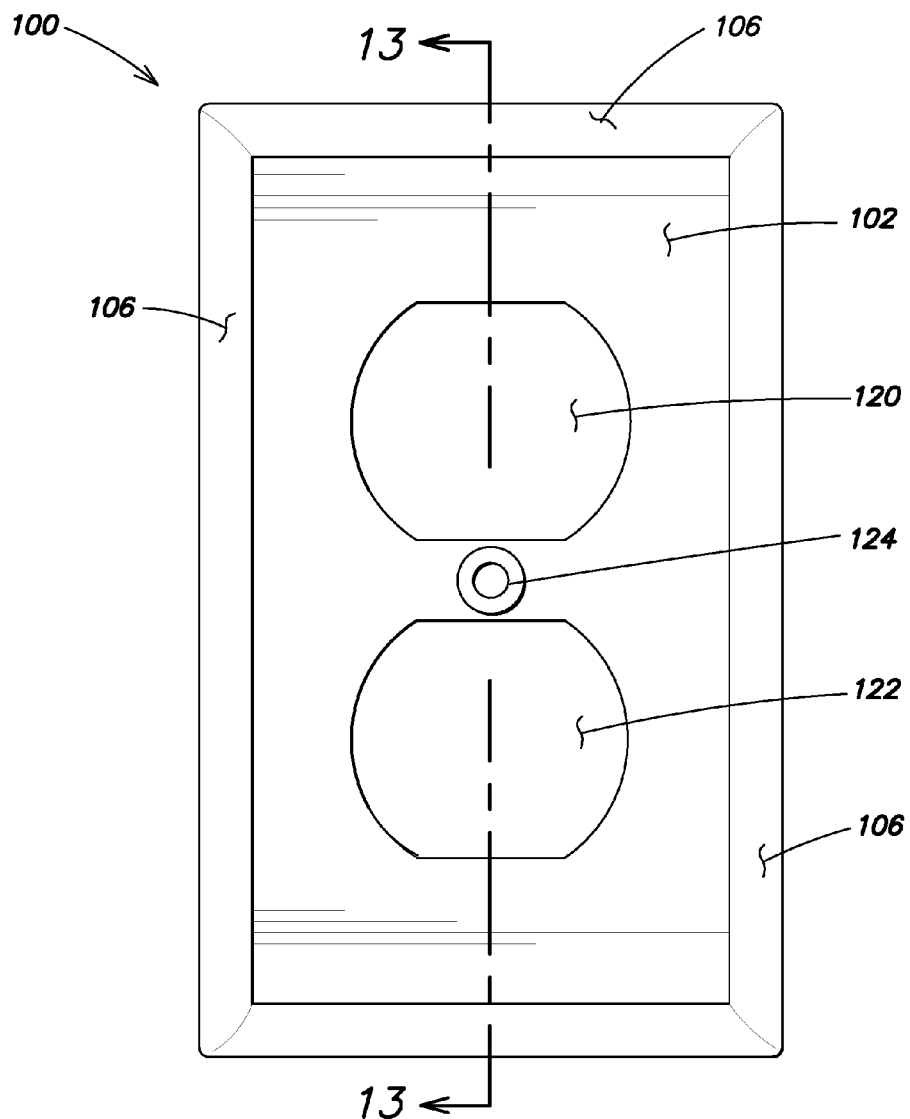
FIG. 10 is a front view of the fourth sealed wall plate.
Figures 11, 12:
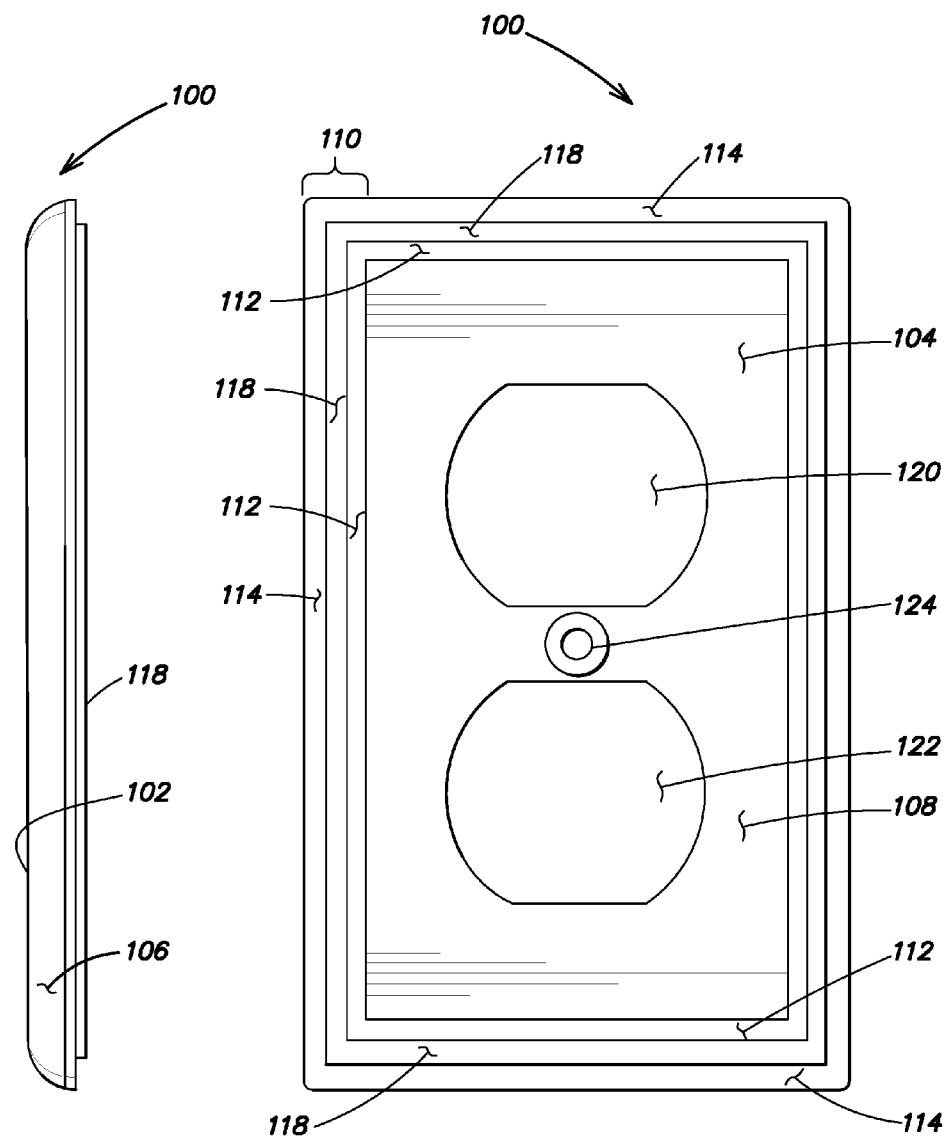
FIG. 11 is a side view of the fourth sealed wall plate.
FIG. 12 is a rear view of the fourth sealed wall plate.
Figure 13:
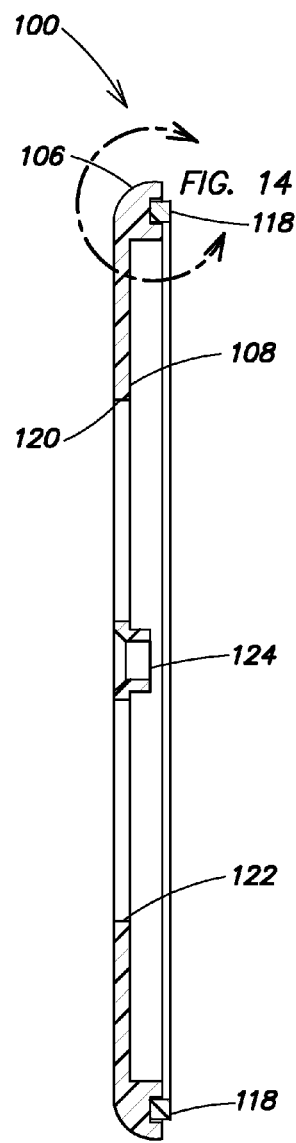
FIG. 13 is a sectional view of the fourth sealed wall plate taken generally about line 13-13 in FIG. 10.
Figure 14:
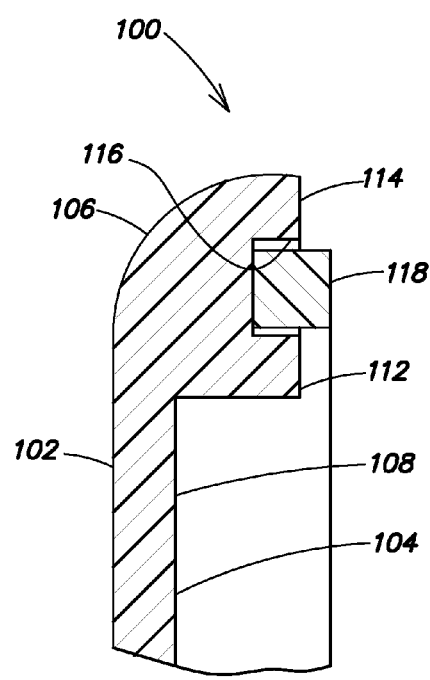
FIG. 14 is an enlarged view of the portion labeled 14 in FIG. 13.
Figure 15:
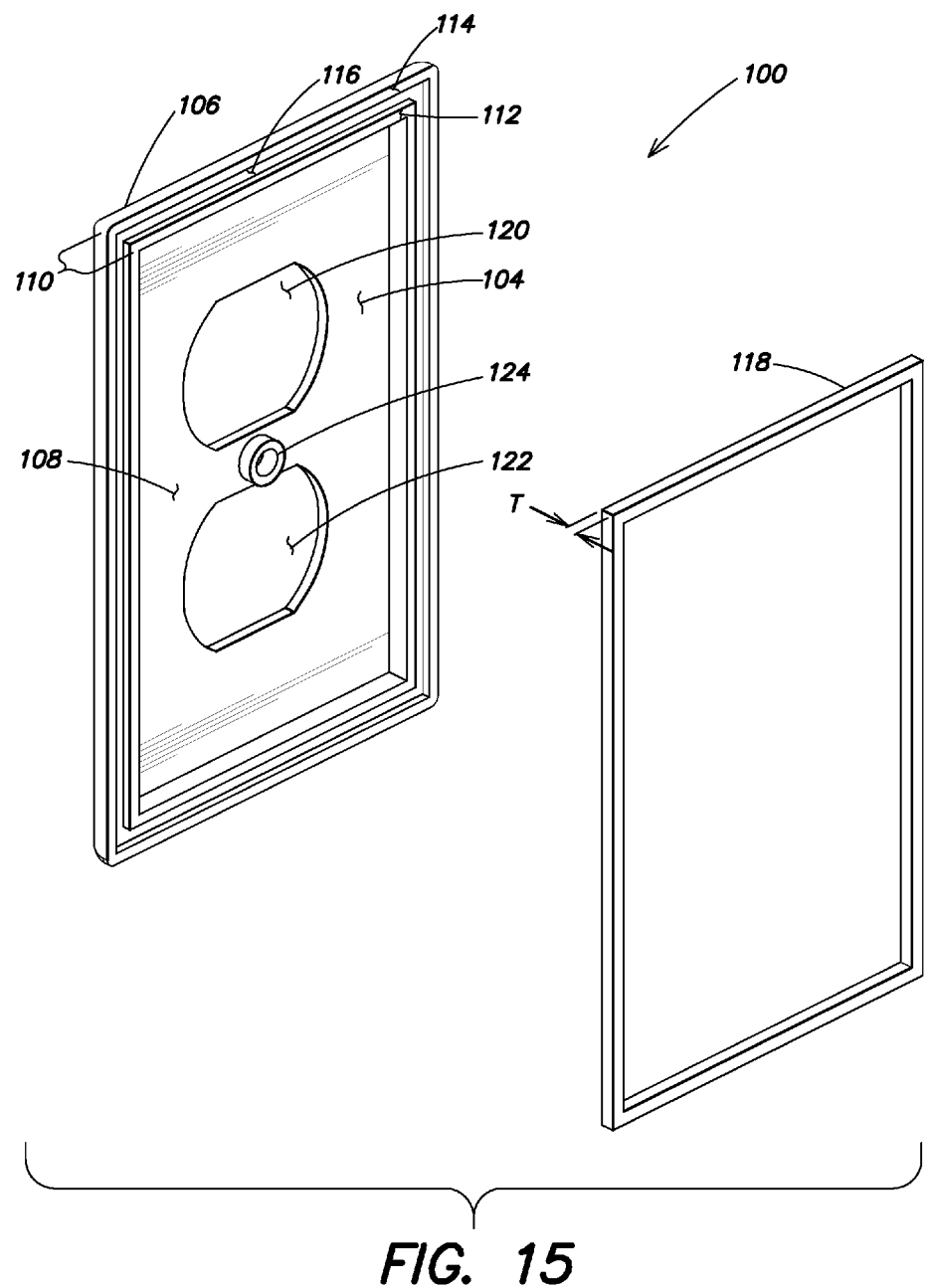
FIG. 15 is a rear perspective view of the fourth sealed wall plate with the gasket removed.

This disclosure, its aspects and implementations, are not limited to the specific components or assembly procedures disclosed herein. Many additional components and assembly procedures known in the art consistent with the intended operation and assembly procedures for a sealed wall plate will become apparent for use with implementations of a sealed wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a sealed wall plate.

FIGS. 1 through 3 illustrate a first implementation sealed wall plate 10. Sealed wall plate 10 includes a plate or body 12 with a front surface 14 and a rear surface 16. A plurality of rear walls 18, 20, 22, and 24 extend rearward from rear surface 16 and together define a cavity 26. Cavity 26 is generally defined by the rear walls and rear surface 16 in addition to a first aperture 28, a second aperture 30, and a mounting screw hole 29. Although first and second apertures 28 and 30 are shown, it is within the spirit and scope of the present disclosure to replace the first and second apertures with any number of suitable openings to complimentarily fit any number of electrical devices or electrical switches.

Sealed wall plate 10 may also include a gasket 31 having a first aperture surround 32 and a second aperture surround 34 which are preferably positioned at least partially within the respective apertures and are arranged to provide a seal between an electrical device within the apertures and the wall plate. Further, the gasket 31 may include openings 36, 38, and 40 in the gasket for receiving the electrical device and mounting screws for installation around an electrical device or electrical switch. In this arrangement, the gasket 31 provides a tight and efficient seal around the electrical device or component such that air cannot pass between the wall plate and the electrical device to affect the conditioned air within the building or the loss of conditioned air within the walls.

FIG. 4 illustrates another aspect sealed wall plate 50 having a plurality of rear walls 52, 54, 56, and 58 similar to the first aspect sealed wall plate 10. The sealed wall plate 50 also includes a rear surface 60 with apertures 62 and 64 therein for receiving an electrical device or electrical switch. Further, an aperture 66 is included for receiving a wall plate mounting screw. The rear walls 52, 54, 56, and 58 together with plate rear surface 60 define a cavity 68 which is arranged to receive a gasket 70. Gasket 70 may be positioned adjacent rear walls 52, 54, 56, and 58 such that the electrical box positioned behind the wall plate may be sealed with respect to the wall plate 50. Gasket 70 may also include an opening 72 therein and permits an electrical device or electrical switch to fit within opening 72 while still sealing the area around the wall plate.

Gaskets 70 and 31 may both be composed of any suitable materials including, but not limited to, foam or rubber. In one aspect, both gaskets 70 and 31 may be utilized in combination to seal the perimeter around the wall plate and seal the perimeter around the electrical device or electrical switch. While only a duplex device wall plate is shown, a person of ordinary skill in the art will immediately appreciate that the wall plate sealing mechanism may be incorporated into any suitable wall plate to seal the device and electrical box areas.

FIGS. 5 through 8 illustrate a third sealed wall plate 80. Third wall plate 80 is similar to the first and second aspect sealed wall plates except that sealed wall plate 80 includes a single aperture 82 arranged to receive a decorator switch. Specifically, a gasket 84 is positioned behind on a back surface of the wall plate 80 and may be large enough to be adjacent the rear walls extending from the rear surface as well as adjacent with and may be partially within the aperture formed in the wall plate. The wall plate 80 functions similar to previously described embodiments with the exception being the type of device that the wall plate surrounds.

FIGS. 9 through 15 illustrate various views of a fourth sealed wall plate 100 with a front surface 102 and a rear surface 104. A side wall 106 extends rearward beyond rear surface 104 to provide a recessed area 108 surrounded by rear walls 110. Rear walls 110 include an inner wall 112 and an outer wall 114. A gasket opening 116 is located between inner wall 112 and outer wall 114 to receive gasket 118 having a thickness T which is larger than a depth of gasket opening 116. In this manner, gasket 118 protrudes rearward beyond inner wall 112 and outer wall 114 so that the gasket can be compressed and restrict the flow of conditioned air between the front and rear surfaces of the wall plate 100.

Wall plate 100 may also include a first aperture 120, a second aperture 122, and a mounting screw aperture 124. First aperture 120 and second aperture 122 are arranged to receive an electrical receptacle therein. In addition, the gasket of FIGS. 1 through 3 can be combined with the gasket of FIGS. 9 through 15 to prevent air transfer between the electrical box and the condition space. Still further, a similar gasket can be incorporated in a decorator style wall plate, a toggle switch wall plate, a duplex receptacle wall plate, or any other wall plate that is attached to a line voltage device, a control switch, a low voltage cable or device, or blank wall plates. Nevertheless, it should be apparent to a person of skill in the art that any suitable wall plate may incorporate a gasket within the scope of the present disclosure. The wall plate gasket may be composed of foam, rubber, plastic, silicone, or any other flexible or compressible material.

Additional embodiments may incorporate a flexible gasket material attached to a track or other suitable alignment mechanism. Specifically, a track may extend rearward from the rear surface and receive an extruded or other suitable material manufacturing technique with or without adhesive to provide a sealing mechanism on the wall plate. Further, the track may include a recessed portion for a silicone or other material that extends at least partially beyond the adjacent track. Nevertheless, a number of other suitable sealing solutions may be envisioned and are within the spirit and scope of the present disclosure.

It will be understood that implementations are not limited to the specific components disclosed herein, as virtually any components consistent with the intended operation of a method and/or system implementation for a sealed wall plate may be utilized. Components may comprise any shape, size, style, type, model, version, class, grade, measurement, concentration, material, weight, quantity, and/or the like consistent with the intended operation of a method and/or system implementation for a sealed wall plate.

The concepts disclosed herein are not limited to the specific implementations shown herein. For example, it is specifically contemplated that the components included in a particular implementation of a sealed wall plate may be formed of any of many different types of materials or combinations that can readily be formed into shaped objects and that are consistent with the intended operation of a sealed wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the sealed wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a sealed wall plate, it should be readily apparent that a number of modifications may be made without departing from the spirit thereof and that these implementations may be applied to other sealed wall plate. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A wall plate comprising:
   a plate having a front surface, a rear surface, and at least one electrical device aperture extending from the front surface to the rear surface;
   an outer perimeter of the rear surface formed by a rear wall and extending rearward from the rear surface;
   a first gasket positioned adjacent the rear wall;
   the first gasket extending rearward from the rear surface of the plate;
   a second gasket separate from the first gasket and surrounding the at least one electrical device aperture and defining an opening in the second gasket inward of the at least one electrical device aperture for receiving a portion of an electrical device;
   the second gasket positioned on the rear surface and extending away from the rear surface of the plate; and,
   at least a portion of the rear surface being visible between the first gasket and the second gasket.

2. The wall plate of claim 1 wherein the at least one electrical device aperture further comprises a first electrical device aperture and a second electrical device aperture.

3. The wall plate of claim 2 wherein the second gasket surrounds both the first electrical device aperture and the second electrical device aperture.

4. The wall plate of claim 1 wherein the first and second gaskets are comprised of foam.

5. The wall plate of claim 1 wherein the first and second gaskets are comprised of rubber.

6. The wall plate of claim 1 wherein the first gasket is positioned in contact with the rear wall.

7. The wall plate of claim 6 wherein the first gasket is positioned radially inward of the rear wall.

8. The wall plate of claim 1 wherein the first gasket and the second gasket are not in contact with each other.

* * * * *